(12) United States Patent
Freimuth

(10) Patent No.: US 10,966,510 B2
(45) Date of Patent: Apr. 6, 2021

(54) FLAT FINGER LOOP

(71) Applicant: Andrew Jacob Freimuth, East Setauket, NY (US)

(72) Inventor: Andrew Jacob Freimuth, East Setauket, NY (US)

( * ) Notice: Subject to any disclaimer, the term of this patent is extended or adjusted under 35 U.S.C. 154(b) by 0 days.

(21) Appl. No.: 16/616,467

(22) PCT Filed: Jun. 4, 2018

(86) PCT No.: PCT/US2018/035818
§ 371 (c)(1),
(2) Date: Nov. 24, 2019

(87) PCT Pub. No.: WO2018/226566
PCT Pub. Date: Dec. 13, 2018

(65) Prior Publication Data
US 2020/0170392 A1    Jun. 4, 2020

Related U.S. Application Data

(60) Provisional application No. 62/516,514, filed on Jun. 7, 2017.

(51) Int. Cl.
*A45F 5/10* (2006.01)
*B65D 23/10* (2006.01)
*A45C 11/00* (2006.01)
*B65D 5/46* (2006.01)
*H04B 1/3827* (2015.01)
*H04B 1/3877* (2015.01)
*H04B 1/3888* (2015.01)

(52) U.S. Cl.
CPC ............... *A45F 5/10* (2013.01); *A45C 11/00* (2013.01); *B65D 5/46192* (2013.01); *B65D 23/104* (2013.01); *H04B 1/385* (2013.01); *H04B 1/3877* (2013.01); *H04B 1/3888* (2013.01); *A45C 2011/002* (2013.01); *A45F 2005/1013* (2013.01); *A45F 2200/0516* (2013.01); *A45F 2200/0583* (2013.01); *H04B 2001/3861* (2013.01)

(58) Field of Classification Search
CPC ..... A45F 5/10; A45C 11/00; A45C 2011/002; A45C 2005/1013; A45C 2200/0516; A45C 2200/0583; B65D 5/46192; B65D 23/104; H04B 1/385; H04B 1/3877; H04B 1/3888; H04B 2001/3861
USPC .................................................... 455/575.1
See application file for complete search history.

(56) References Cited

U.S. PATENT DOCUMENTS

| | | | | |
|---|---|---|---|---|
| 8,550,317 | B2* | 10/2013 | Hyseni | A45F 5/00 224/197 |
| 2010/0222118 | A1* | 9/2010 | Interdanato | A45F 5/00 455/575.6 |

\* cited by examiner

*Primary Examiner* — Lee Nguyen

(57) ABSTRACT

A flat finger loop is a flat and flexible membrane that has a first opening and a second opening having a shape and orientation with respect to each other such that the region between them can alternately form a loop with a tight and secure grip on a finger when a finger is inserted through one opening and out of the other, and can collapse completely flat and flush with the rest to the membrane when the loop is not is use. The flat finger loop can also be attached to portable objects, such as a smartphone, whereby the object becomes stuck to and thus effortlessly held by a single finger.

9 Claims, 3 Drawing Sheets

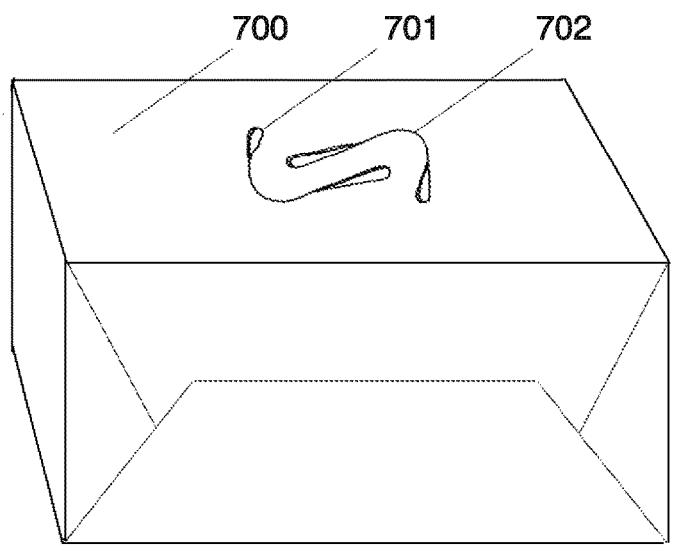
FIG. 7
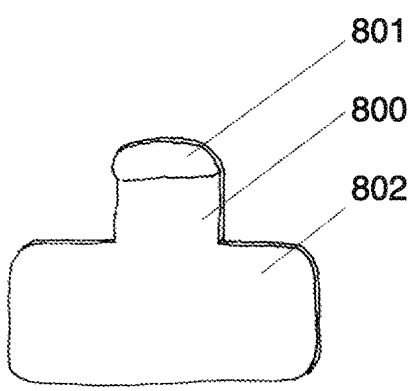
FIG. 8
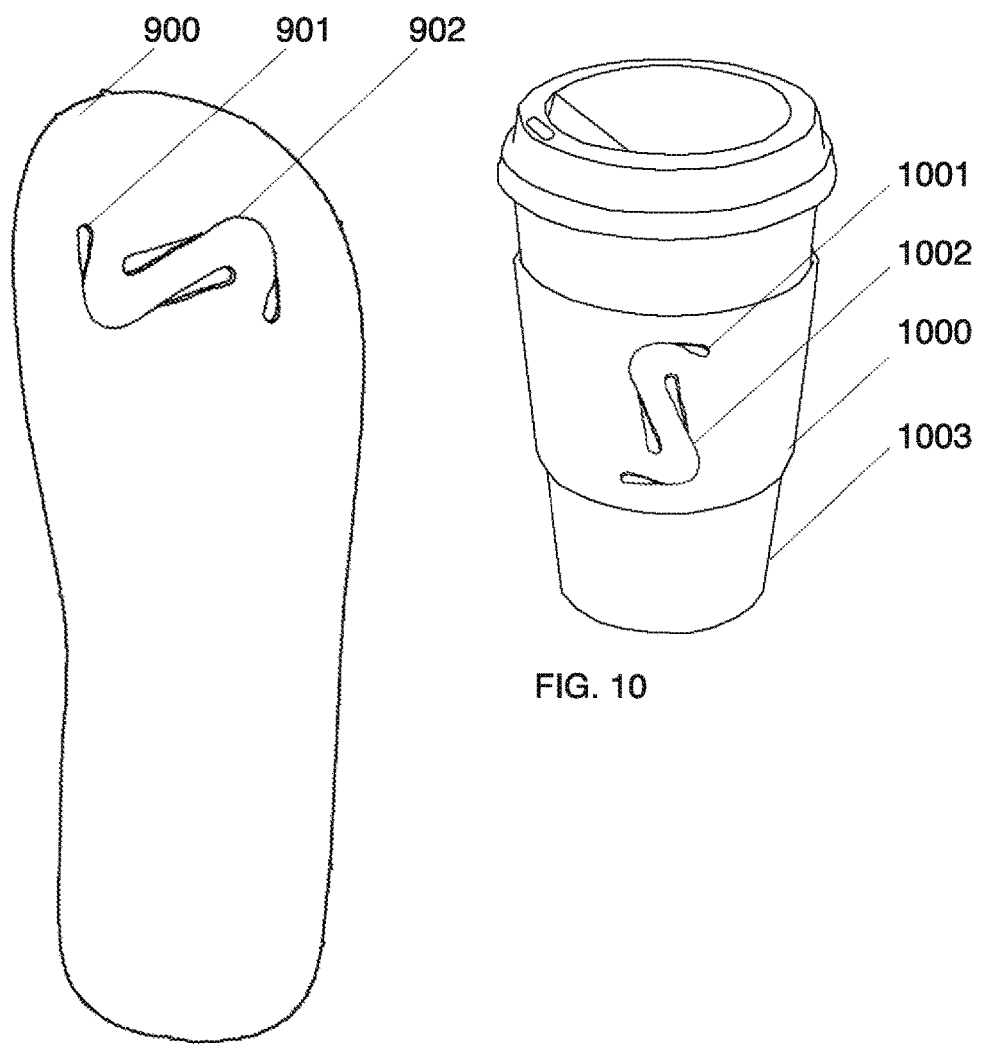
FIG. 9
FIG. 10 of 4 US 10,966,510 B2

FLAT FINGER LOOP

CROSS-REFERENCE TO RELATED APPLICATIONS

This application claims priority to U.S. Provisional Patent Application No. 62/516,514, filed Jun. 7, 2017, the content of which is hereby incorporated by reference in its entirety.

BACKGROUND OF THE INVENTION

I. Field of the Invention

This application relates to holding mechanisms for an object such as a handheld portable input device such as a smartphone, tablet, mp3 player, camera, or other portable object, which attach the object to a user's finger so as to reduce physical strain on the user and also to improve ease of use or operation of the device.

II. Discussion of the Related Art

Holding a smartphone by grasping it with one's hand is awkward as it limits the holding hand's fingers' freedom of motion to interact with the screen or ability to hold something else, bears the inherent risk that the grip could be lost and the smartphone could be dropped, can be unergonomic for holding the smartphone in ideal orientations for extended periods, and is an inefficient burden on the hand, fingers, and the holder's attention. Smartphones are meticulously designed to have as sleek and thin a profile as possible, so that a smartphone may easily slip in and unnoticeably reside in a user's pocket, lay squarely on a table, and occupy the least possible space, so it is important that any solution to this problem add the least possible material, weight, profile, or dimension to the smartphone or smartphone case. The same can be said for a wide range of other portable objects as well, where a sleeker, more efficient, and more economical means of holding would be beneficial.

SUMMARY OF THE INVENTION

This invention solves this problem by providing a flat finger loop that attaches to an object like a smartphone in a flat conformation that adds the minimal possible thickness, profile, and weight to the smartphone, and that can be temporarily contorted into a loop conformation that grips the holder's finger (or a plurality of fingers) tightly and securely, enabling the smartphone to be held by that finger in numerous ergonomic orientations. This solution is ideal for a smartphone, but can be similarly applied to any portable handheld object, so hereunder 'smartphone' is used replaceably for a tablet, mp3 player, camera, any other handheld portable input device, or any other portable object.

BRIEF DESCRIPTION OF DRAWINGS

FIG. 7 shows a side perspective view of another embodiment of the invention, where the object is the contents of a parcel.

FIG. 8 shows a front perspective view of an acoutrement to the invention.

FIG. 9 shows a top perspective view of another embodiment of the invention, where the intent is to attach a membrane to a toe, and there is no object for the membrane to attach to.

FIG. 10 shows a front perspective view of another embodiment of the invention, where the object is a coffee cup.

DETAILED DESCRIPTION OF DRAWINGS

Figure 1A:
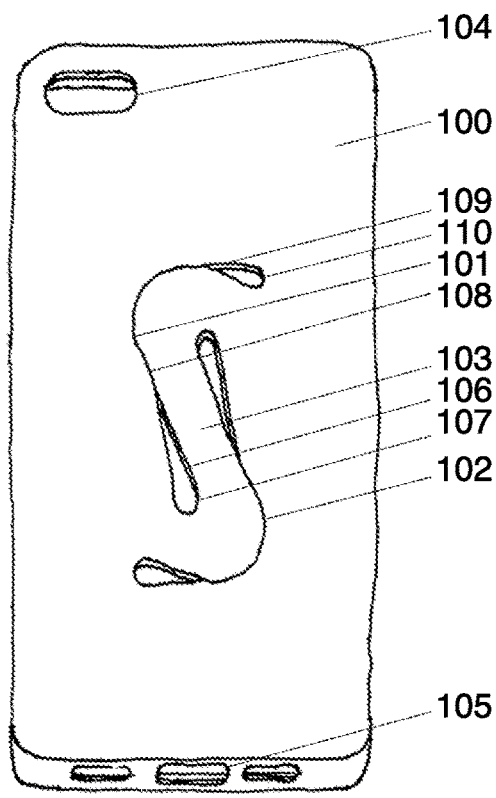
FIG. 1A shows a top perspective view of a preferred embodiment of the invention, with the loop in flat conformation, having no smartphone attached.

To describe the invention in more detail, FIG. 1 shows a perspective view of a first embodiment of the invention, where a flexible membrane 100 has a first opening 101 and a second opening 102 shaped such that the edge of the first opening 101 and an imaginary straight line through some two points along the edge of the first opening 101 bound a first subregion containing part of the second opening 102 and such that the edge of the second opening 102 and an imaginary straight line through some two points along the edge of the second opening 102 bound a second subregion containing part of the first opening 101 (By 'edge' is meant the visible edge of the opening when viewed, from a top perspective, and the 'lines' referred to are not lines that physically are present in the invention, but are instead imaginary and can be envisioned over the geometry of the invention, or drawn on a diagram of the invention). The first opening 101 and the second opening 102 in this embodiment take the form of a long 'J' shaped cut (which could also be described as a 'C' shaped cut, or a narrow non-inflected curved line), with a rounded bulb or teardrop on either end. This rounded bulb on the end serves to prevent the end of the 'J' shaped cut from tearing when strained, which is especially important when the 'J' shaped cut is very thin. The membrane 100 further has a means of attaching to a smartphone, which in this embodiment is achieved by a portion of the membrane taking the form of a smartphone case which fits around the sides of the smartphone and removably interlocks with it. The strip between the first opening 101 and second opening 102 thus forms an 'S' shaped portion of a loop 103, which in its flat conformation is completely flat and flush with the back side of the membrane 100, but can be temporarily contorted out of a flat conformation and into a loop conformation when a finger is passed from one side of the membrane through the first opening 101 to the other side of the membrane and then out again through the second opening 102, or through the second opening 102 to the other side of the membrane and then out again through the first opening 101, whereby the finger will become attached to the membrane 100 and thus also attached to the smartphone. The loop 103 is able to contort without requiring the material of the membrane in the region surrounding the first opening 101 and second opening 102 and the loop 103 to be capable of stretching, only requiring it to be flexible. The size of the openings can be made such that given the type and thickness of the membrane material, and the intended size of the finger to be used, the loop 103 will fit tightly around the finger, which causes the smartphone to not merely hang from the finger but become stuck to the finger, and rotate in any direction the finger rotates, and resist slipping off the finger even if the user's hand is dangling listlessly at their side without them paying any attention to keeping the phone attached to their finger. Though the loop 103 fits tightly around the finger, the width and flatness of the portion of the loop 103 that comes into contact with the finger distributes the pressure and makes the fit comfortable. Additionally the edges along the border of the first opening 101 and second opening 102 may be rounded in shape to maximize the comfort for the finger, as when thicker and stiffer materials are used for the membrane material, square edges can form a sharp surface for a finger. The region of the membrane around the first opening 101 and second opening 102 can be made of thermoplastic polyurethane (TPU), polyethylene, polypropylene, silicone, vinyl, plastic, rubber, Tyvek, Revlar, natural leather, synthetic leather, cloth, woven material, cardboard, or out of any other flexible material, and the other parts of the membrane outside this region may optionally be made of the same materials, or may be made of harder materials such as polycarbonate, other hard plastics, carbon fiber, or metal, or other hard materials known in the art of smartphone cases. This embodiment may be made by injection molding, or by first injection molding the membrane 100, and then cutting the first opening 101 and second opening 102 out, for example, using a die, and then optionally rounding and smoothing the edges, or by using any other techniques known in the art of manufacturing smartphone cases. The membrane 100 may have a plurality of other openings corresponding to features of a smartphone as is standard in the art of smartphone cases, such as an opening for a smartphone camera lens 104 or an opening for a connecting cable 105. To further describe this embodiment, the first opening 101 and second opening 102 are formed by a cut in the shape of a 'J', each beginning with a 20 mm tall teardrop shape 106 with a 2.5 mm radius bulbous part 107, then continuing with a narrow section 108 extending directly up from the top of the tall teardrop shape 106 for 10 mm before curving 90 degrees at a 10 mm radius, then ending with a 10 mm tall teardrop shape 109 with a 2.5 mm bulbous part 110, and the second opening 102 is rotated 180 degrees with respect to the first opening 101 and spaced apart from the first opening 101 such that the loop 103 is formed with a 10 mm width. These dimensions and angles can be made larger or smaller, given the desired finger size and the type and thickness of membrane material used in the region surrounding the first opening 101 and second opening 102 to alter the tightness of the loop's grip on the finger, and the openings do not have to be limited to the shapes described. The 'J' shape of the cut is understood to be the same as a 'C' shape, or any curved line with a single concavity and no inflection. If the edge corners (meaning the profile of the edge along a path starting at a point on the front of the membrane and by the side of the edge, over the edge, across the thickness dimension of the membrane, and ending at a corresponding point on the back of the membrane and by the side of the edge) of the shaped cut are rounded off along the straight vertical portion of the this will provide a comfortable contact surface for the finger. If the edge corners are square and abutting along the curved portion of the 'J', the loop will have the ability to removably lock into the surrounding membrane. It is ideal for the first opening 101 and second opening 102 to be positioned such that the center of the region in between the first opening 101 and the second opening 102 is horizontally centered, and vertically closer to the bottom than it is to the top with respect to the normal vertical orientation of the smartphone case. Another way to describe the shape of the first opening 101 and second opening 102 of this embodiment is as a narrow non-inflected curved line defined as any line with any width that is able to fit within the bounds of a region defined by the union of an up to 1 mm wide and 20 mm long rectangular region tangentially abutting (tangentially abutting meaning with end of the rectangular region abutting a line extending radially from the center of the circle to the curved edge of the circle and the corner of the abutting end of the rectangular region farthest from the center of the circle is abutting the curved edge of the circle) an up to 120 degree portion of a circle with radius of up to 20 mm and where said line begins at the non-abutting end (the opposite end to the end that abuts the portion of the circle), and where the narrow non-inflected curved line is joined at either end to the narrow part of an up to 50 mm long teardrop shape with a bulbous end portion with radius of up to 3 mm, and where the second opening is rotated between 160 and 200 degrees with respect to the first opening and spaced apart from the first opening such that the resulting strip of the membrane between the first opening and the second opening has an up to 20 mm width, and where a region of the membrane surrounding the first opening and the second opening is up to 3 mm in thickness and made from a material that may include one of the following: thermoplastic polyurethane (TPU), polyethylene, polypropylene, polyurethane, vinyl, silicone, a blend of plastics, rubber, natural leather, synthetic leather. This invention is not necessarily restricted to this range of dimensions.

Figure 1B:
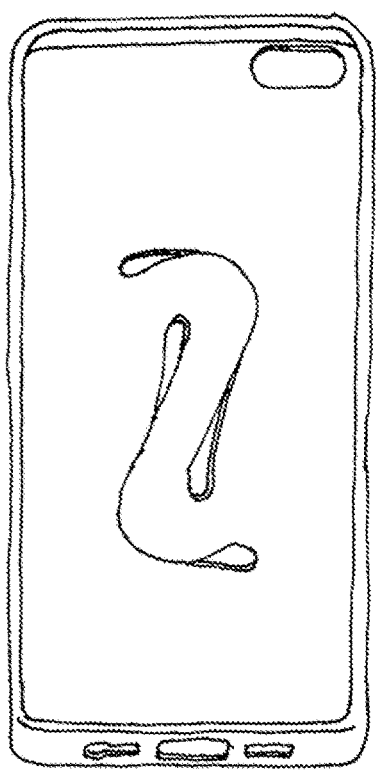
FIG. 1B shows a top perspective view of the other side of the embodiment of FIG. 1A, with the loop in flat conformation, having no smartphone attached.

FIG. 1B shows a top perspective view of the other side of the embodiment of FIG. 1A, the inside of the smartphone case, having no smartphone attached.

Figure 1C:
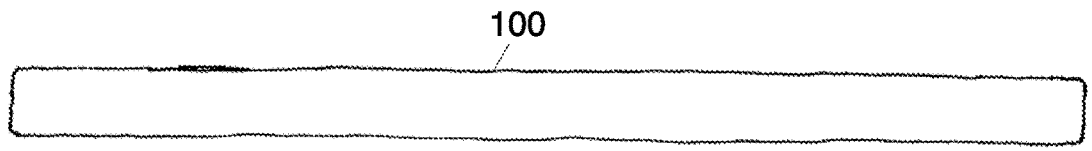
FIG. 1C shows a side view of the embodiment of FIG. 1A, with the loop in flat conformation, having a smartphone attached within the smartphone case.

FIG. 1C shows a side view of the embodiment of FIG. 1A, in a flat conformation, having a smartphone attached within the case. As the loop is in its flat conformation, it is completely flush with back side of the membrane 100 and so it is not visible from this side view.

Figure 1D:
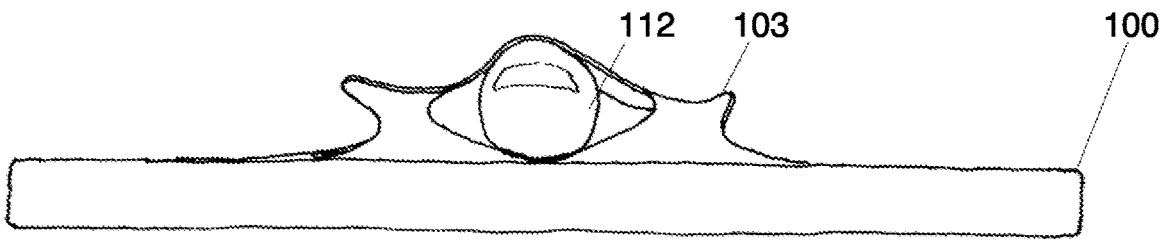
FIG. 1D shows a side view of the embodiment of FIG. 1A, having a smartphone attached within the smartphone case, with the loop in a loop conformation, with a finger inserted through the loop.

FIG. 1D shows a side view of the embodiment of FIG. 1A, having a smartphone attached within the case, with the loop in a loop conformation, with a finger 112 inserted through the loop 103, which is thus contorted out of its flat confirmation and is no longer flush with the back side of the membrane 100, while the portion of the membrane with form and function of a smartphone case that removably interlocks with the smartphone does not change its shape and remains attached to the smartphone.

Figure 1E:
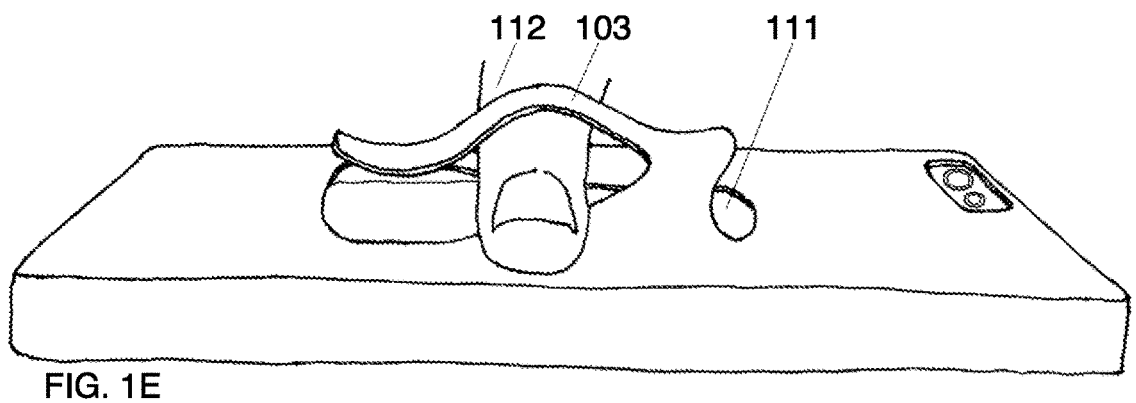
FIG. 1E shows a side perspective view the embodiment of FIG. 1, having a smartphone attached within the smartphone case, with the loop in a loop conformation, and with a finger inserted through the loop.

FIG. 1E shows a side perspective view the embodiment of FIG. 1, having a smartphone 111 attached within the case, with the loop 103 in a loop conformation, and with a finger 112 inserted through the loop 103, which is now contorted out of its flat conformation and is no longer flush with the back side of the membrane 100, while portion of the membrane with form and function of a smartphone case that removably interlocks with the smartphone does not change its shape and remains attached to the smartphone 111.

Figure 2:
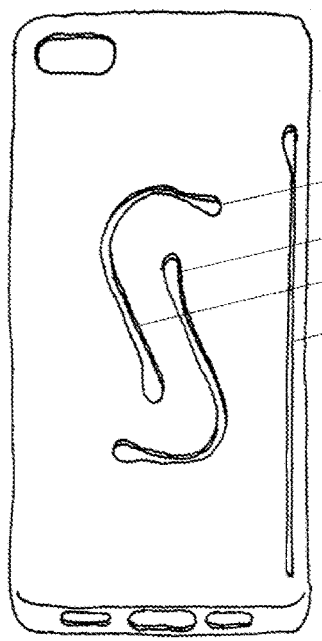
FIG. 2 shows a top perspective view of another embodiment of the invention, with the loop in flat conformation.

FIG. 2 shows a top perspective view of another embodiment of the invention, which is the same as the embodiment of FIG. 1, except that the first opening 201 and second opening 202 have a different shape where the narrow section 203 on each opening is wider, and there is a third opening 204 through which a credit card may be partially inserted.

Figure 3:
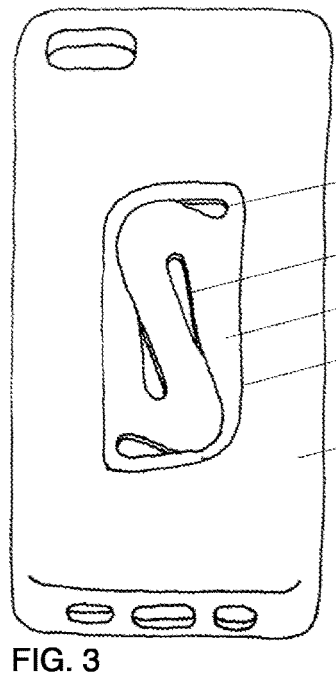
FIG. 3 shows a top perspective view of embodiment f the invention, with the loop in flat conformation.

FIG. 3 shows a top perspective view of another embodiment of the invention, comprising a smartphone case 303 having a back-side opening 304 through which part of and inner flexible membrane layer 300 containing a first opening 301 and second opening 302 (which are shaped and oriented as in the embodiment of FIG. 1) is exposed. The inner flexible membrane layer 300 may be nested within the smartphone case, and the portion corresponding to the back-side opening 304 may be raised such that it is flush with the back of the smartphone case 303. Alternatively, the inner flexible membrane layer 300 may be permanently bonded or adhered to the smartphone case 303. The smartphone case 303 may be made of a hard, impact resistant material such as polycarbonate, polyurethane, or other stiff plastic, carbon fiber, fiberglass, metal, wood, or other materials and formed with impact reducing features as known in the art of impact resistant smartphone cases.

Figure 4:
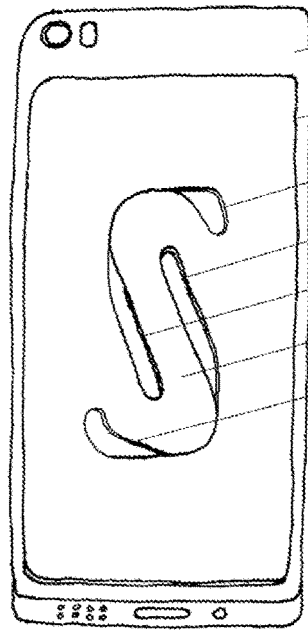
FIG. 4 shows a top perspective view of another embodiment of the invention, with the loop in flat conformation.

FIG. 4 shows a top perspective view of another embodiment of the invention, which is the same as the embodiment of FIG. 1, except the means by which the membrane 400 attaches to the smartphone is an adhesive, and the membrane 400 does not itself take the form or serve the function of a smartphone case. The adhesive is located on the backside of the membrane, outside of the inner region containing the first opening 401 and second opening 402. The membrane 400 thus forms a sticker which can be directly attached to the back of the smartphone 403, or alternatively to the back of a case for the smartphone 403. Again, 'smartphone' is used replaceably for any portable object, such as a handheld electronic input device like a mp3 player, tablet, or camera, or such as a parcel or package, for example, and instead of an adhesive, the membrane could be heat sealed, welded, stitched, or bonded. In this embodiment, compared to the embodiment of FIG. 1, the shapes defining each of said first opening 401 and said second opening 402, have a top teardrop bulb shape 404 that is larger, having the effect of making the loop 406 fit more loosely given the same surrounding membrane material and thickness, and also have a bottom teardrop bulb shape that is larger, making it easier for a fingernail to get under the loop 406 and a finger to slide through. Optionally, a portion of the edges of the membrane material between the first opening 401 and second opening 402 can be made to haze a slight upward curl, to make it easier for a finger to slide under the loop 406.

Figure 5:
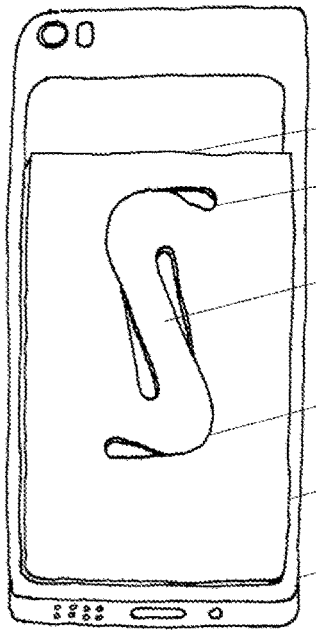
FIG. 5 shows a top perspective view of another embodiment of the invention, with the loop in flat conformation.

FIG. 5 shows a top perspective view of another embodiment of the invention, with the loop in flat conformation, where this embodiment is the same as the embodiment of FIG. 1, except that the membrane 500 takes the form of a credit card pocket 505 in which a plurality of credit cards may be inserted and securely held, and where the front of the pocket 505 contains the first opening 501 and second opening 502 forming part of the loop 503, and where the back of the pocket attaches to the smartphone 504 by adhesive. The membrane 500 thus forms a credit card pocket sticker which attaches to the smartphone 504 directly.

Figure 6:
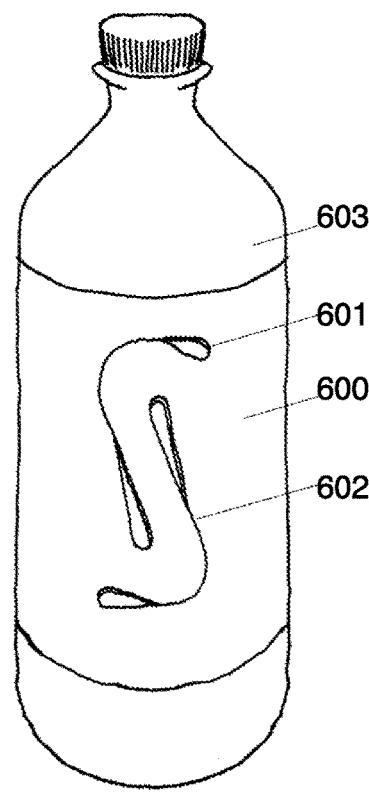
FIG. 6 shows a side view of another embodiment of the invention, where the object is a bottle.

FIG. 6 shows a side view of another embodiment of the invention, where the membrane 600 comprises a label adhered to a bottle 603, said label having a first opening 601 and second opening 602 as described in FIG. 1, where first opening 601 and second opening 602 may be sized such that a single finger can be inserted though the loop and thus the bottle may be held from a single finger. Alternatively, the first opening 601 and second opening 602 may be sized so that 4 or 5 fingers can pass through, thus forming a handle. The means of attaching to the bottle can comprise an adhesive on a portion of one side of the membrane, or a heat seal, or other methods standard to the art of applying labels to bottles. In this embodiment, the label may be made of Revlar, Tyvek, Polypropylene, Polyethylene, fabric, or any other thin and tear resistant material, or any other material known in the art of label making. The larger the bulbous ends of the curved-shaped openings are, the more resistant the membrane will be to tearing.

FIG. 7 shows a side perspective view of another embodiment of the invention, where the membrane 700 comprises packaging that completely engulfs an object (in other words, the membrane completely encloses the object), for example, the membrane could comprise a piece of reinforced cardboard that forms into a closed box, with one of the faces having a first opening 701 and second opening 702 as described in FIG. 1, which can be sized and oriented so as to be able to form a loop that multiple fingers can pass through, thus creating a handle. The membrane could be made of plastic, Tyvek, Revlar, paper, cardboard, cloth, a mix of the foregoing, or any other tear resistant materials known in the art of packaging.

FIG. 8 shows a front perspective view of an accouterment to the invention: a tab 800 having an outwardly bent tip 801 and a portion with adhesive backing 802 for to a second object, for example, a wall. Then the invention as described above, for example in the embodiment of FIG. 1, can attach to a first object as described, and then slid over the bent tip 801 and the tab 800 may thus be inserted through the first opening and out of the second opening, whereby the first embodiment and first object become attached to the second object. For example, in this way, a smartphone may be attached to a wall, or car dashboard.

FIG. 9 shows a top perspective view of another embodiment of the invention, where a membrane 900 has a first opening 901 and a second opening 902 as described in the embodiment of FIG. 1, although here a toe may be inserted through the loop, and the membrane takes the form of a sandal. The membrane may be made out of foam, leather, cloth, Tyvek, plastic, rubber, silicone, a composite of several such materials, or other material known in the art of footwear. Optionally, a plurality of other layers may be attached to the membrane, by adhesive, stitching, heat sealing, velcro, or other methods of adherence known in the art of footwear, in order to add to the sole. This embodiment differs from the previous embodiments as the membrane doesn't need to have a means of attaching to an object—here the purpose is to attach a toe to the membrane. Some examples of other similar uses would be to attach a fan to a hand, to attach a paddle to a hand, to attach a sign to a hand.

FIG. 10 shows a front perspective vies of another embodiment of the invention, where a coffee cup jacket 1000 has a first opening 1001 and a second opening 1002 as described in the embodiment of FIG. 1, but where the object is a coffee cup and the means of attaching is the size of the jacket being such that the cup can partially, but not completely pass through it (in other words, the membrane encloses the coffee cup, at least in part). This makes a handle with which it possible to hold a coffee cup with a plurality of fingers in several different ways.

What has been described includes examples of the subject invention. It is not possible to describe every conceivable combination of components, but one of ordinary skill in the art will recognize that many further combinations and permutations of the subject invention are possible, which the subject matter of this invention is intended to encompass.

The invention claimed is:

1. A flexible membrane having: a first opening and a second opening, each having a shape and orientation with respect to each other such that it is possible to choose two points along the edge of said first opening so that a portion of the edge of said first opening and a straight line through said two points along the edge of said first opening bound a region of said membrane containing part of said second opening and such that it is possible to choose two points along the edge of said second opening so that a portion of the edge of said second opening and a straight line through said two points along the edge of said second opening bound a region of said membrane containing part of said first opening; whereby the region between said first opening and said second opening is able to contort out of a flat orientation when a plurality of fingers are inserted through one said opening and out of the other said opening, forming a loop around said plurality of fingers, and where said first opening and said second opening are each formed in the shape of a narrow non-inflected curved line having rounded bulbous ends, where a portion of said first opening and said second opening have rounded edge corners and a portion of said first opening and said second opening have square edge corners, with portions of said first opening and said second opening having square edge corners that are abutting, and where said narrow non-inflected curved line is defined as any line segment of any width that is able to fit within the bounds of a region defined by the union of an up to 1 mm wide and up to 20 mm long rectangle tangentially abutting an up to 120 degree portion of a circle with radius of up to 20 mm and where said line begins at the non-abutting end of said rectangular region, and where said narrow non-inflected curved line is joined at either end to the narrow part of an up to 50 mm long teardrop shape with a bulbous end portion with radius of up to 3 mm, and where said second opening is rotated between 160 and 200 degrees with respect to said first opening and spaced apart from said first opening such that the resulting strip of said membrane between said first opening and said second opening has an up to 20 mm width, and where a region of said membrane surrounding said first opening and said second opening is up to 3 mm in thickness and made from a material selected from the group consisting of at least one of the following: thermoplastic polyurethane (TPU), polyethylene, polypropylene, polyurethane, vinyl, silicone, a blend of plastics, rubber, natural leather, synthetic leather.

2. The membrane of claim 1, where said object is a smartphone, and said membrane has a means of attaching to said smartphone comprising said membrane having the form of a smartphone case that interlocks with said smartphone.

3. The membrane of claim 2, where the line segment within the region between said first opening and said second opening and tangential to the edges of both said first opening and said second opening is within a range of 10 degrees to being parallel to an edge of said smartphone case, and within a range of 20% to being centered on said smartphone case.

4. A membrane comprising: a first opening and a second opening, where the length of the portion of the edge of said first opening between an edge of said first opening and said second opening and bounded by any two points that exist on said portion of the edge of said first opening that are farthest apart along said portion of the edge of said first opening and on separate continuous segments of intersection with the shortest possible path between a first tangent point at which one of two tangent lines, each tangent to both said first opening and said second opening, is tangent to said first opening and a second tangent point where the other of said two tangent lines is tangent to said second opening, where said first tangent point and said second tangent point are chosen so that the length of the shortest possible path between the said first tangent point and said second tangent point through the region between said first opening and said second opening is minimized, and where the length of the portion of the edge of said second opening between an edge of said second opening and said first opening and bounded by any two points that exist on said portion of the edge of said second opening that are farthest apart along said portion of the edge of said second opening and on separate continuous segments of intersection with said shortest possible path between said first tangent point and said second tangent point, differ by at most 10% of the length of the smaller of the two, and such that for any point on the first of said two tangent lines and between and excluding said first opening and said second opening and for any point on the second of said two tangent lines and between and excluding said first opening and said second opening, the shortest possible path between said point on said first of said two tangent lines and said second of said two tangent lines and through the region between said first opening and said second opening is greater in length than the straight line between said first point and said second point; such that a plurality of fingers may be inserted through either said opening and out of the other said opening whereby a region of said membrane between said first opening and said second opening changes out of a flat orientation and into a loop orientation and forms a loop around said plurality of fingers that tightly grips said plurality of fingers.

5. The membrane of claim 4, where there is a difference in angular direction from 90 degrees up to 270 degrees between a first line from a point on said first of said two tangent lines and emanating perpendicularly in a direction away from said first opening and said second opening and a second line from a point on said second of said two tangent lines and emanating perpendicularly in a direction away from said first opening and said second opening, and where, in a copy of said membrane that is an exact copy except that the material composing the region of said membrane surrounding and including said first opening and said second opening is replaced with a material that is flexible but minimally elastic, such as thermoplastic polyurethane (TPU) of between 1.5 mm and 3 mm in thickness, the region between said first opening and said second opening in said exact copy of said membrane is able to contort out of a flat orientation when a plurality of fingers are inserted through one said opening and out of the other said opening, forming a loop around said plurality of fingers while said exact copy of said membrane remains attached to said object, thus attaching said plurality of fingers to said object, and where when viewed from a top perspective, the edge of each of said first opening and said second opening has a smooth profile without corners and having an internal region defined by a narrow 'J' shaped line having a rounded bulb shape at either end of width at least equal to that of said narrow T shaped line.

6. The membrane of claim 5, further having a means of attaching to an object, such that when the region of said membrane between said first opening and said second opening changes out of a flat orientation and into a loop orientation in which it forms a loop around said plurality of fingers that tightly grips said plurality of fingers, the rest of said membrane remains attached at least in part to said object, whereby said object becomes attached to said plurality of fingers.

7. The membrane of claim 6, where said object is a smartphone and said membrane takes the form of a smartphone case, and where the line segment bounded by the region between said first opening and said second opening and tangential to the edge of both said first opening and second opening is within a range of 20 degrees to being parallel to an edge of a side of said smartphone case, and where along a portion of the edge of each of said first opening and said second opening, the profile of the path beginning on at a point near the edge and on one side of said membrane, traversing over the edge and then ending at a corresponding point near the edge on the other side of said membrane, is rounded.

8. A smartphone case having: a first opening and a second opening, each having a shape and orientation with respect to each other such that it is possible to choose two points along the edge of said first opening so that a portion of the edge of said first opening and a straight line through said two points along the edge of said first opening bound a region containing part of said second opening and such that it is possible to choose two points along the edge of said second opening so that a portion of the edge of said second opening and a straight line through said two points along the edge of said second opening bound a region containing part of said first opening; whereby the region between said first opening and said second opening is able to contort out of a flat orientation when a plurality of fingers are inserted through one said opening and out of the other said opening, forming a loop around said plurality of fingers and attaching said plurality of fingers to said smartphone case, while said smartphone case remains attached to a smartphone, thus attaching said plurality of fingers to said smartphone, and where said first opening and said second opening are each formed in the shape of a narrow non-inflected curved line having rounded bulbous ends, where a portion of said first opening and said second opening have rounded edge corners, and where said narrow non-inflected curved line is defined as any line segment of any width that is able to fit within the bounds of a region defined by the union of an up to 1 mm wide and up to 20 mm long rectangle tangentially abutting an up to 120 degree portion of a circle with radius of up to 20 mm and where said line begins at the non-abutting end of said rectangular region, and where said narrow non-inflected curved line is joined at either end to the narrow part of an up to 50 mm long teardrop shape with a bulbous end portion with radius of up to 3 mm, and where said second opening is rotated between 160 and 200 degrees with respect to said first opening and spaced apart from said first opening such that the resulting strip of said membrane between said first opening and said second opening has an up to 20 mm width, and where a region of said membrane surrounding said first opening and said second opening is up to 3 mm in thickness and made from a material selected from the group consisting of at least one of the following: thermoplastic polyurethane (TPU), polyethylene, polypropylene, polyurethane, vinyl, silicone, a blend of plastics, rubber, natural leather, synthetic leather.

9. The smartphone case of claim 8, where the edge of each of said first opening and said second opening when viewed from a top perspective, has a smooth profile with an internal region having a shape defined by a narrow 'J' shaped line having a rounded bulb shape at either end of width at least equal to that of said narrow 'J' shaped line, and where the line segment bounded by the region between said first opening and said second opening and tangential to the edge of both said first opening and second opening is within a range of 20 degrees to being parallel to an edge of a side of said smartphone case and within a range of 20% to being centered on said smartphone case, and where along a portion of the edge of each of said first opening and said second opening, the profile of the path beginning on one side of said smartphone case, traversing over the edge and then ending at a corresponding point near the edge on the other side of said smartphone case, is rounded.

\* \* \* \* \*